United States Patent [19]

Mutoh et al.

[11] Patent Number: 4,545,940

[45] Date of Patent: Oct. 8, 1985

[54] METHOD OF DEWAXING A VEGETABLE OIL

[75] Inventors: Yoshihiko Mutoh; Kazuo Matsuda; Masashi Ohshima; Hiroo Ohuchi, all of Yokohama, Japan

[73] Assignee: Asahi Kasei Kogyo Kabushiki Kaisha, Osaka, Japan

[21] Appl. No.: 480,819

[22] Filed: Mar. 31, 1983

[30] Foreign Application Priority Data

Apr. 9, 1982 [JP] Japan .................................. 57-58255

[51] Int. Cl.$^4$ ............................................... C09F 5/10
[52] U.S. Cl. .................................................... 260/428
[58] Field of Search ......................................... 260/428

[56] References Cited

U.S. PATENT DOCUMENTS 4,229,297 10/1980 Nohmi et al. ........................ 210/654
4,414,157 11/1983 Iwana et al. ........................ 260/428

FOREIGN PATENT DOCUMENTS 2521074 11/1975 Fed. Rep. of Germany ...... 260/428
85895 5/1982 Japan .................................. 260/428

*Primary Examiner*—Anton H. Sutto
*Attorney, Agent, or Firm*—Finnegan, Henderson, Farabow, Garrett & Dunner

[57] ABSTRACT

A method of dewaxing a vegetable oil which comprises adjusting the temperature of a vegetable oil containing a wax to allow the wax to crystallize and subjecting the temperature-adjusted oil to filtration by means of a porous membrane having a critical surface tension ($\gamma c$) of less than 33 dynes/cm and having an average pore diameter of 0.05 to 5 $\mu$m, thereby selectively permeating the vegetable oil through the membrane while separating the wax from the vegetable oil. The process of the present invention is useful not only for dewaxing a vegetable oil but also for removing a wax together with a phospholipid, a free fatty acid and water from a crude vegetable oil.

9 Claims, No Drawings

METHOD OF DEWAXING A VEGETABLE OIL

This invention relates to a method of dewaxing a vegetable oil. More particularly, the present invention is concerned with a method of removing a wax from a vegetable oil by means of a porous membrane. The process of the present invention is useful not only for dewaxing a vegetable oil but also for removing a wax together with a phospholipid, a free fatty acid and water from a crude vegetable oil.

As is well known, a crude vegetable oil contains a wax, a phospholipid, a free fatty acid, a pigment, water and the like. The wax clouds the oil and degrades its taste; the phospholipid clouds the oil, degrades its taste and produces undesirable smell; the free fatty acid degrades its taste and produces undesirable smell; the pigment produces undesirable appearance; and water accelerates the oxidation of the oil, which, in turn, degrades its taste and produces undesirable smell. Therefore, in the manufacture of an edible vegetable oil, these substances must be removed. Conventionally, in the manufacture of an edible vegetable oil on a commercial scale, the above-mentioned undesirable substances have been generally removed from the crude vegetable oil by the following method. First of all, the phospholipid and free fatty acid are simultaneously or separately removed from the crude vegetable oil by centrifugation. The thus treated vegetable oil is decolorized using an activated clay or the like. Then, the decolorized vegetable oil is cooled to allow a wax contained in the decolorized vegetable oil to crystallize. The cooled decolorized vegetable oil is subjected to filtration to remove the wax from the vegetable oil. The dewaxed vegetable oil is then dehydrated by vacuum drying or the like. Of the above-mentioned steps for refining a vegetable oil, the most troublesome step is the dewaxing of the vegetable oil. Some more specific explanation on conventional dewaxing methods will be given below. The dewaxing of a vegetable oil has conventionally been carried out by filtration using a filter aid. In general, a filter aid such as perlite is added to the cooled vegetable oil and the resulting mixture is subjected to filtration by means of a rotary filter, filter press or leaf filter using, as a filter medium, a filter cloth, metal gauze or the like. In such a filtration method, there are various disadvantages as will be described below. First of all, the permeation rate of the vegetable oil decreases with a lapse of time because of the clogging of the filtration medium by the wax and the like. This clogging frequently occurs. Every time the clogging of the filtration medium occurs, the filter apparatus should be dismantled in order to clean the filtration medium. This work requires many hands and takes so much time. Therefore, a high productivity in obtaining the dewaxed oil cannot be achieved. Secondly, since the vegetable oil is adsorbed on the filter aid, the yield of the dewaxed oil is lowered. Thirdly, a large amount of waste filter aid is produced. The disposal of the waste filter aid brings about another problem. Fourthly, the filter apparatus itself should be placed in a low temperature room. Therefore, a large amount of energy is required. For the above-mentioned reasons, an efficient dewaxing method has been desired in the art. Further, as mentioned above, complicated steps are required to refine the vegetable oil. Therefore, the simplification of the steps for refining a vegetable oil have also been required. The present inventors have made extension and intensive studies with a view to eliminating all of the foregoing defects involved in the conventional techniques and to providing a method of efficiently removing a wax from a vegetable oil. As a result, the present inventors have found that a wax contained in a vegetable oil can be effectively removed without using any filter aid when a porous membrane having specific surface characteristics is employed as the filter medium, and that, when a crude vegetable oil containing a phospholid, a free fatty acid and water as well as a wax is subjected to filtration by means of the above-mentioned porous membrane, the phospholipid, free fatty acid and water can be removed together with the wax from the crude vegetable oil to an extent that no conventionally employed steps for removing the phospholipid, free fatty acid and water are required. The present invention has been made based on such novel findings.

Accordingly, it is an object of the present invention to provide a method of effectively dewaxing a vegetable oil by means of a porous membrane.

It is another object of the present invention to provide a method of producing a refined vegetable oil with a high productivity.

The foregoing and other objects, features and advantages of the present invention will be apparent to those skilled in the art from the following detailed description and appended claims.

In accordance with the present invention, there is provided a method of dewaxing a vegetable oil which comprises:

adjusting the temperature of a vegetatable oil containing a wax to a temperature of about $-10°$ C. to about $20°$ C. to allow the wax to crystallize; and subjecting the temperature-adjusted vegetable oil to filtration by means of a porous membrane having pores which form passages running through the membrane from one surface thereof to the other surface thereof, said porous membrane having at its surface a critical surface tension ($\gamma c$) of less than 33 dynes/cm and having an average pore diameter of 0.05 to 5 $\mu$m, thereby selectively permeating the vegetable oil through the membrane while separating the crystallized wax from the vegetable oil.

As the vegetable oil to be treated in the present invention, there may be mentioned sunflower oil, safflower oil, corn oil, sesame oil, rape oil, linseed oil, cottonseed oil, rice bran oil, castor oil, olive oil, tsubaki oil, coconut oil, palm oil, perilla oil, hemp seed oil, tung oil, kapok oil, tea seed oil, soybean oil and the like.

In the method of the present invention, the vegetable oil to be treated includes crude oils, containing a wax, a phospholipid, a free fatty acid and water, of the above-mentioned vegetable oils and vegetable oils which have been subjected to the refining steps for removing a phospholipid, a free fatty acid and a pigment contained in the crude vegetable oil. Of the above-mentiond vegetable oil, sunflower oil, safflower oil, rice bran oil, corn oil, sesame oil and rape oil have a high wax content. However, by the method of the present invention, the wax can be efficiently separated from these vegetable oils. Further, as mentioned above, when the vegetable oil to be treated contains a phospholipid, a free fatty acid and water as well as a wax, these substances can be simultaneously removed. Therefore, the steps for preliminarily removing a phospholipid, a free fatty acid and water can be advantageously eliminated.

A mixture of a vegetable oil and an organic solvent such as hexane or acetone, for example miscella, can also be treated according to the method of the present invention. Moreover, vegetable oils containing, in addition to a wax, a phospholipid, a free fatty acid and water, natural contaminants such as sulfur compounds, peptides, pigments, aldehydes and ketones may be treated according to the method of the present invention. Furthermore, vegetable oils containing minute amounts of foreign substances incorporated intentionally or involuntarily at the oil extraction step or in the refining process, such as alkalis, acids, metal ions and inorganic and organic solid fine particles may be treated by the method of the present invention.

In the present invention, it is indispensable that the temperature of the vegetable oil to be treated be adjusted to a temperature of about $-10°$ C. to about $20°$ C. to allow a greater part of the wax contained in the vegetable oil to crystallize. In case the temperature of the vegetable oil to be treated is higher than $20°$ C., the wax contained in the vegetable oil cannot be sufficiently crstallized. On the other hand, with respect to the lower limit of the temperature, about $-10°$ C. is preferable from the standpoint of energy consumption. A preferable temperature at which a greater part of the wax contained in the vegetable oil to be treated crystallizes varies depending on the kind of the vegetable oil to be treated. When the vegetable oil to be treated is sunflower oil, corn oil, sesame oil or rape oil, the wax crystallizing temperature is preferably $0°$ C. to $10°$ C. As mentioned above, when the vegetable oil to be treated contains a phospholipid and a free fatty acid as well as a wax, these substances can be simultaneously removed by the process of the present invention. To remove the phospholipid to a great extent, addition of an acid to the crude vegetable oil is preferred. To remove the free fatty acid to a great extent, addition of an alkali to the crude vegetable oil is preferred. As the acid, at least one member selected from the group consisting of phosphoric acid, sulfuric acid, boric acid, citric acid, oxalic acid and acetic acid is preferably employed, and phosphoric acid is most preferably employed. As the alkali, sodium hydroxide or the like is preferably employed. It is preferred to employ an acid in an amount 0.01 to 3.0 times the amount of the phospholipid contained in the crude vegetable oil. It is also preferred to employ an alkali in an amount 0.01 to 3.0 times the amount of the free fatty acid contained in the crude vegetable oil. The acid and alkali can be added to the vegetable oil to be treated prior to, during or posterior to the adjustment of the vegetable oil temperature.

The characteristic features of the porous membrane that is used in the present invention will now be described.

In order to obtain a refined vegetable oil substantially free of a wax it is necessary to use a porous membrane having a specific pore size and special surface characteristics. The porous membrane that is used in the present invention has an average pore diameter ($2\bar{r}$) of 0.05 to 5 $\mu$m, preferably 0.1 to 1 $\mu$m. When the average pore diameter is smaller than 0.05 $\mu$m, the oil permeation rate per unit membrane area and per unit time is low and therefore, a large membrane area is necessary. When the average pore diameter is larger than 5 $\mu$m, permeation of the wax through the membrane is increased, so that a vegetable oil substantially free of a wax cannot be obtained.

The average pore radius ($\bar{r}$) is represented by the formula $$\bar{r} = [8Q\eta d/(\Delta P \cdot Pr)]^{\frac{1}{2}}$$

wherein
Q is a liquid permeability of the porous membrane, $cm^3/cm^2 sec$;
$\eta$ is a viscosity of the liquid, poise;
d is a thickness of the porous membrane, cm;
$\Delta P$ is a pressure difference between on one surface and on the other surface of the porous membrane, $dyne/cm^2$; and
Pr is a porosity of the porous membrane, %.

The pore radius distribution in the porous membrane to be employed in the method of the present invention is preferably as narrow as possible. Illustratively stated, the ratio $\bar{r}_4/\bar{r}_3$ represents a pore radius distribution and is preferably 1.5 or less. The $\bar{r}_3$ and $\bar{r}_4$ are respectively represented by the formula $$\bar{r}_3 = \int r^3 N(r)dr / \int r^2 N(r)dr$$

$$\bar{r}_4 = \int r^4 N(r)dr / \int r^3 N(r)dr$$

wherein
r is the pore radius in the surface of the porous membrane; and
N(r) is a pore radius distribution function and is defined to give the number of pores having a pore radius falling within the range of r to r+dr.

The values of r and N(r) are obtained by visual observation using a scanning electron microscope.

As the simple method of determining the pore radius distribution ($\bar{r}_4/\bar{r}_3$), besides the method by visual observation using a scanning electron microscope, there can be mentioned a method as described in "Kobunshi Ronbun Shu (Collected theses on polymers)" Vol. 34, No. 10, p 737 (1977), published by the Society of Polymer Science, Japan. According to this method, through the measurement of gas permeation, $X_3$ and $X_4$ are obtained from the term of free molecular flow and the term of viscous flow, respectively (wherein $X_i = \int r^i N(r)dr$). $\bar{r}_4$ can be calculated from the formula $\bar{r}_4 = X_4/X_3$. In addition, utilizing the porosity of the porous membrane and the phenomenon that when a salt in the aqueous solution is diffusion-permeated into the porous membrane the salt will permeate through the pores by self-diffusion, $X_2$ is obtained, from the following equation, using the permeation quantity (J) of the salt:

$$J = \pi \cdot X_2 \cdot D_s (dc/dx)$$

wherein
$D_s$ is a self-diffusion coefficient;
c is a concentration of the salt; and
x is a distance from the surface of the porous membrane.

$\bar{r}_3$ can be calculated from the formula $\bar{r}_3 = X_3/X_2$. Accordingly, the pore radius distribution ($\bar{r}_4/\bar{r}_3$) can be obtained by other method than the method by visual observation using a scanning electron microscope. Meanwhile, the value of $X_4$ can be obtained also by assuming a viscous flow (Hagen-poiseuille's flow) at the time when the liquid permeates through the porous membrane as described in "Kobunshi Ronbun Shu" Vol. 34, No. 4, p 299 (1977), published by the Society of Polymer Science, Japan.

With respect to the porous membrane that is used in the present invention, it is also indispensable that the porous membrane have at its surface a critical surface tension ($\gamma c$) of less than 33 dynes/cm. When the critical surface tension of the porous membrane is 33 dynes/cm or more and the vegetable oil to be treated contains water, not only water is permeated together with the oil through the membrane but also the oil permeation rate is lowered with a lapse of time. The reason for the lowering of the oil permeation rate is believed to reside in that water contained in the vegetable oil stops the pores of the membrane. The lower limit of the critical surface tension of the porous membrane that is used in the present invention is not critical. However, in view of availability of materials having a low critical surface tension, the porous membrane having at its surface a critical surface tension ($\gamma c$) of less than 33 dynes/cm to not less than 18 dynes/cm is generally employed.

As a porous membrane having at its surface a critical surface tension ($\gamma c$) of less than 33 dynes/cm, there may be employed porous membranes made of a single class of resin having a critical surface tension of less than 33 dynes/cm. There may also be employed porous membranes made of a blend polymer or copolymer of two or more classes of components. In the latter case, as far as the finished porous membranes have a critical surface tension of less than 33 dynes/cm, some component resin need not have a specific value of critical surface tension as defined above. Further, it is also possible to obtain a desired porous membrane having the above-specified critical surface tension by modifying the surface of a porous membrane with chemical species by means of coating or chemical binding. Illustrative examples of materials employable for obtaining the desired porous membranes include polyolefins such as polyethylene, polypropylene, polybutene, polyisobutylene, polypentene, poly(4-methylisopentene) and their halogen-substituted derivatives having at least one fluorine atom: tetrafluoroethylene-perfluoroalkyl vinyl ether copolymers; copolymers of ethylenically unsaturated hydrocarbons and/or halogen-substituted ethylenically unsaturated hydrocarbons having at least one fluorine atom, said ethylenically unsaturated hydrocarbons and their halogen-substituted derivatives including ethylene, propylene, butene, isobutylene, pentene, hexene, monofluoroethylene, vinylidene fluoride, trifluoroethylene, tetrafluoroethylene, trifluorochloroethylene, hexafluoropropylene and the like: and blend polymers such as a combination of polyethylene with polypropylene, polyvinylidene fluoride, polytetrafluoroethylene or polystyrene; a combination of polypropylene with polyvinylidene fluoride or polytetrafluoroethylene; a combination of polyvinylidene fluoride with polysulfone, polyacrylonitrile, polyphenylene oxide or polytetrafluoroethylene; and the like. Preferred examples of materials employable for desired porous membranes include a polyethylene, polypropylene, ethylene-propylene copolymer, polyvinylidene fluoride, ethylene-tetrafluoroethylene copolymer, tetrafluoroethylene-hexafluoropropylene copolymer, tetrafluoroethylne-perfluoroalkyl vinyl ether copolymer and blends thereof.

The value of a critical surface tension is measured as follows. Where the porous membrane is made of a homogeneous material, a non-porous membrane is produced using the same material and used as a sample for the measurement. Where the porous membrane is not made of a homogeneous material but modified, on its surface, with chemical species by means of coating or chemical binding, a nonporous membrane is produced using the same material and then modified, on its surface, with chemical species under the same conditions as employed for production of the surface modifed porous membrane to provide a sample for the measurement. The critical surface tension ($\gamma c$) is defined to be a surface tension which would be exerted if the contact angle $\theta$ is equal to 0°. The sample prepared by the method as mentioned above is measured, with respect to contact angle, using liquids having a varied surface tension, and a surface tension which would be exerted if the contact angle $\theta$ is equal to 0°, is calculated by extrapolation. The value thus obtained is that of the critical surface tension.

It is preferred that the porosity of the porous membrane that is used in the present invention be in the range of from 15 to 95%. In general, when the porosity is lower than 15%, the oil permeation rate is low, and when the porosity is higher than 95%, the strength of the membrane is reduced.

Incidentally, the porosity Pr is defined by the following formula:

$$Pr = (1 - \rho b/\rho a) \times 100\ (\%)$$

wherein $\rho a$ stands for the specific gravity of the membrane having no pores and $\rho b$ stands for the value obtained by dividing the weight of the porous membrane by the volume thereof.

It is preferred that the thickness of the porous membrane that is used in the present invention be in the range of from 0.01 to 4 mm. When the thickness of the porous membrane is smaller than 0.01 mm, the strength of the membrane is low, and when the thickness of the membrane is larger than 4 mm, the oil permeation rate is reduced.

The porous membrane that is used in the present invention may be a flat membrane, a pleated membrane, a tubular membrane or a hollow fiber, and an appropriate shape is selected according to the intended use. In order to reduce the size of a module and simplify the module structure, it is preferred that a hollow fiber membrane be used.

When a hollow fiber membrane is used, it is preferred that the inner diameter be in the range of from 0.1 to 10 mm. When the inner diameter is smaller than 0.1 mm, the open end portion of the hollow fiber is readily clogged with the wax or the like and no good results can be obtained. When the inner diameter is larger than 10 mm, the volume of the module constructed by using the membrane is undesirably increased.

A known method can be adopted for the production of a porous membrane satisfying the foregoing requirements. For example, there can be adopted a melt-molding method as disclosed in British Pat. No. 2,006,513, and a microphase-separation method, a stretching method and a neutron beam radiation method.

The method and conditions for supplying the temperature-adjusted vegetable oil to the porous membrane will now be described.

In the method of the present invention, the percentage of the amount of the vegetable oil to be permeated through the membrane relative to the amount of the vegetable oil supplied to the membrane (hereinafter referred to simply as "oil permeation") is not critical. Illustratively stated, 100% of the vegetable oils supplied to the membrane may be permeated through the membrane or part of the vegetable oil supplied to the membrane may be withdrawn without being permeated. However, from the standpoint of the yield of the refined vegetable oil and energy consumption, it is preferred that the oil permeation be 90% or more. Further, in the method of the present invention, a so-called partial circulation filtration method in which a concentrated oil having a wax content increased, which has been obtained by concentration using a membrane, is contacted with the same membrane several times may be adopted.

It is preferred that the filtration pressure at the time of the contact of the temperature-adjusted vegetable oil with the porous membrane be 0.01 to 5 atm. When the filtration pressure is lower than 0.01 atm, the oil permeation rate is low, and when the filtration pressure is higher than 5 atm, not only the porous membrane is readily broken but also the energy consumption is increased.

In the filtration temperature at the time of the contact of the vegetable oil with the porous membrane is such a temperature that the wax crystallized upon adjustment of the temperature of the vegetable oil to be treated does not dissolve in the vegetable oil. In general, the filtration temperature of $-10°$ C. to $40°$ C. is employed. A preferable filtration temperature varies depending on the kind of the vegetable oil to be treated. When the vegetable oil to be treated is sunflower oil, corn oil, sesame oil or rape oil, a filtration temperature of $0°$ C. to $30°$ C. is preferably employed.

During the filtration of the temperature-adjusted vegetable oil, the oil permeation rate will occasionally decrease with a lapse of time due to the deposition of the wax and the like on the surface of the membrane. In such a case, it is preferred that the membrane is subjected to backwash treatment and/or flushing treatment by means of a fluid of $30°$ C. to $100°$ C. The term "backwash" as used herein is intended to mean reversely flowing a fluid through the membrane. The term "flushing" as used herein is intended to mean flowing a fluid at a high speed on the surface of the membrane in a direction parallel to the surface of the membrane. Particularly, when the porous membrane is a hollow fiber membrane, the oil permeation rate can be easily returned to the original permeation rate by subjecting the hollow fiber membrane to backwash treatment and/or flushing treatment by means of a fluid of $30°$ C. to $100°$ C. In the backwash treatment and flushing treatment, an excellent oil permeation rate redeeming effect can be attained by using a fluid of $30°$ C. to $100°$ C. because the backwash treatment and flushing treatment can be carried out while melting the wax deposited on the surface of the membrane. Therefore, in case the fluid temperature is less than $30°$ C., an excellent backwash or flushing effect cannot be attained. With respect to the upper limit of the fluid temperature, $100°$ C. is preferable from the standpoint of energy consumption. As the fluid, there may be mentioned a liquid selected from the group consisting of the vegetable oil permeated through the membrane, n-hexane and acetone, or a gas selected from the group consisting of air, nitrogen, oxygen, carbonic acid, argon and helium. Usually, the backwash or flushing treatment by using a gas is less effective than that by using a liquid. However, by using a gas of $30°$ C. to $100°$ C., a good oil permeation rate redeeming effect can be achieved. Therefore, from the standpoint of simplicity in construction of the backwash and flushing apparatus, productivity of dewaxed oil and energy consumption, the above-mentioned gases are more preferably employed. Nitrogen gas and air are most preferable from the standpoint of economy. In order that the wax and the like deposited on the surface of the membrane may be easily discharged by the backwash and/or flushing treatment from the module of the hollow fiber membrane, it is preferred that the module of the hollow fiber be placed so that the longitudinal axis of the module has an inclined angle of $30°$ C. or more relative to the horizontal plane or is perpendicular relative to the horizontal plane. This is particularly preferable when the backwash and/or flushing treatments are carried out using a gas.

The method of dewaxing a vegetable oil of the present invention is extremely suitable for the manufacture of an edible vegetable oil on a commercial scale. Some advantages of the method of the present invention over the conventional dewaxing methods in which a filter aid is employed will be described below.

(1) In the method of the present invention, since any filtration aid is not employed, there is a great economical advantage, the yield of the dewaxed oil is high; and no burdensome waste filter aid is not produced.

(2) A wax, a phospholipid, a free fatty acid and water can be simultaneously removed from the vegetable oil. Therefore, when the vegetable oil to be treated is a vegetable oil containing these substances, the steps for preliminarily removing the phospholipid, free fatty acid and water which are necessarily carried out in the edible vegetable oil production on a commercial scale can be eliminated. That is, the considerable simplification of the steps for refining a vegetable oil can be achieved.

(3) In the method of the present invention, since a porous membrane is used as a filter medium, the filter apparatus can be compact. Therefore, the apparatus itself is not necessarily required to be cooled.

In the method of the present invention, when the backwash treatment and/or flushing treatment are intermittently carried out, the following further advantages can be attained. Since the operation including the cycle of the filtration of the vegetable oil, the stopping of the filtration, the backwash treatment and/or flushing treatment of the membrane and the re-starting of the filtration of the vegetable oil, and repetition of the cycle can be fully made automatic, the continuous use of the membrane for about one year or more is possible. This is very advantageous for the manufacture of a dewaxed oil on a commercial scale. Specifically, the dismantling of the filter apparatus for cleaning the filter media is not required at all. The dismantling of the apparatus is required only when the damage of the porous membrane is observed. Therefore, the stopping of the filtration operation for hours which has been required in the conventional methods can be eliminated.

As is well known, the wax separated from a vegetable oil can be used for various applications such as bases of cosmetics. Because of no use of any filter aid, a wax separated from a vegetable oil according to the process of the present invention can be simply purified as compared with a mixture of a filter aid and a wax separated from a vegetable oil according to the conventional method in which the use of an filter aid is necessarily required.

The following Examples illustrate the present invention in more detail but should not be constructed as limiting the scope of the invention.

In the Examples, the properties of a Sample oil were evaluated as follows.

1. WAX CONTENT (1) Cold test

A sample oil was cooled to 0° C., and allowed to stand at 0° C. for 48 hours except that, in Example 7, the sample oil was allowed to stand at 0° C. for 30 min. Formation of cloud in the oil was visually observed. The formation of cloud in the oil indicates the presence of a wax.

(2) Gas liquid chromatography (GLC)

The wax content of a Sample oil was determined by gas liquid chromatography according to the procedures described in W. Herbert Morrison, et al., J.A.O.C.S., 52, 148 (1975).

2. PHOSPHOLIPID CONTENT

The phospholipid content of a Sample oil was determined according to the Lorenz method.[A.O.C.S. (American Oil Chemists' Society) Ca 12-55].

3. WATER CONTENT

The water content of a Sample oil was determined according to the Karl Fischer's method. (A.O.C.S. Ca 2e-55).

4. Color

The color of a Sample oil was examined by the Lovibond tintometer using 133.4 mm (5¼ in.)-glass cell according to J.O.C.S. (The Japan Oil Chemists Society) 2.3.1b-71.

5. ACID VALUE

The acid value of a Sample Oil was determined according to A.O.C.S. Cd 3a-63.

6. PEROXIDE VALUE (POV)

The peroxide value of a Sample oil was determined according to A.O.C.S Cd 8-53.

7. IODINE VALUE

The iodine value of a Sample oil was determined according to A.O.C.S. Cd 1-25.

8. AOM (ACTIVE OXYGEN METHOD) STABILITY

The AOM stability was tested according to A.O.C.S. Cd 12-57.

9. DEGRADATION BY LIGHT

A sample oil was exposed to light from a fluorescent lamp having a light intensity of 7,000 lux for 4 hours.

With respect to the thus exposed oil, the POV and the odor by heating were examined as follows.

(1) POV

The POV was determined by the same method as described in item 6.

(2) Odor by heating

The oil exposed to light was heated to 120° C., and an odor from the heated oil was compared with an odor from the oil not exposed to light but heated to 120° C.

10. FLAVOR

The flavor of a Sample oil was evaluated organoleptically by tasting.

EXAMPLE 1

20.0% by weight of Suntec SH-800 (the trade name of a high density polyethylene manufactured and sold by Asahi Kogyo K.K., Japan), 56.4% by weight of dioctyl phthalate (DOP) and 23.6% by weight of finely divided silica were mixed by a kneader and pulverized by a pulverizer, and the resulting mixture was melt-extruded into a hollow fiber by using a twin extruder and a hollow nozzle. The extrudate was cooled and taken up. The obtained hollow fiber was immersed in 1,1,1-trichloroethane to extract and remove DOP, and the hollow fiber was dried and was immersed in an aqueous solution containing 40% by weight of caustic soda to dissolve the finely divided silica in the aqueous solution. Then, the hollow fiber was washed with a diluted aqueous solution of caustic soda and then with water and was dried to obtain a porous hollow fiber membrane.

The membrane had an inner diameter of 1.5 mm, a thickness of 500 $\mu$m, an average pore diameter of 0.12 $\mu$m, a porosity of 71% and a critical surface tension ($\gamma c$) of 31 dynes/cm.

A module having an effective membrane area of 5 m$^2$ was prepared by using this hollow fiber membrane.

A sunflower oil containing 0.26 wt.% of a wax which had been treated to remove therefrom a phospholipid, a free fatty acid and a pigment (an oil which had been subjected to the treatment as mentioned just above is hereinafter referred to as "decolorized oil") was cooled to 5° C., whereby wax crystals were precipitated. The thus cooled decolorized sunflower oil was supplied to the module which was placed perpendicularly relative to the horizontal plane and the filtration was carried out at an oil permeation of about 100%, a filtration temperature of 10° C. and an average filtration pressure of 2 kg/cm$^2$. The oil permeation rate was 60 liter/hr immediately after the beginning of the filtration, but it decreased to 35 liter/hr after effecting the filtration for one hour. The module was subjected to a backwash operation for 2 minutes using nitrogen gas of 55° C. as the backwash fluid. After the backwash of the module, the filtration was resumed, and it was found that the oil permeation rate was returned to substantially the same rate as that observed immediately after the beginning of the filtration.

The filtration operation was carried out for 12 hours in total, and during the filtration operation, the backwash of the module with 55° C. nitrogen gas was effected for 2 minutes at a frequency of once an hour. Due to the backwash of the module, the stable filtration could be performed at an average oil permeation rate of 50 liter/hr.

The permeated oil was subjected to gas liquid chromatography (GLC) for determination of the wax content. According to the GLC analysis, it was found that the wax content of the permeated oil was 0.003 wt.%. The permeated oil was also subjected to the cold test to examine the presence of a wax. As a result, no cloud was observed in the permeated oil. From these results, it is understood that the permeated oil was substantially free of wax.

COMPARATIVE EXAMPLE 1

By using the same module as used in Example 1, dewaxing of the decolorized sunflower oil (50° C.) as used in Example 1 was carried out in the same manner as in Example 1 except that the cooling of the sunflower oil prior to the filtration was not effected.

The permeated oil obtained had a wax content of 0.22 wt% according to the GLC analysis. As a result of the cold test, cloud was observed in the permeated oil. From these results, it is understood that the wax could not be removed sufficiently.

EXAMPLE 2

26.7% by volume of Tefzel P-200 (the trade name of an ethylene-tetrafluoroethylene copolymer manufactured and sold by E. I. Du Pont De Nemours and Company, U.S.A.), 60.0% by volume of DOP and 13.3% by volume of finely divided silica were kneaded, pulverized and melt-extruded by using a twin extruder and a hollow nozzle. The extrudate was cooled and taken up. The obtained hollow fiber was immersed in 1,1,1-trichlorethane to extract and remove DOP, and the hollow fiber was dried and was immersed in an aqueous solution containing 40% by weight of caustic soda to dissolve the finely divided silica in the aqueous solution. Then, the hollow fiber was washed with a diluted aqueous solution of caustic soda and then with water and was dried to obtain a porous hollow fiber membrane.

The membrane had an inner diameter of 1.5 mm, a thickness of 500 μm, an average pore diameter of 0.3 μm, a critical surface tension (γc) of 26.5 dynes/cm and a porosity of 70%.

A module having an effective membrane area of 3 m² was prepared by using this hollow fiber membrane.

By using the above-prepared module, the same decolorized sunflower oil as used in Example 1 was cooled to 5° C. and subjected to filtration under the same conditions as described in Example 1. The oil permeation rate was 42 liter/hr immediately after the beginning of the filtration, but it decreased to 24 liter/hr after effecting the filtration for one hour. The module was subjected to a backwash operation for 2 minutes using the filtrate (50° C.) as the backwash liquid. After the backwash operation, the filtration was resumed, and it was found that the oil permeation rate was returned to substantially the same rate as that observed immediately after the beginning of the filtration.

The filtration operation was carried out for 12 hours in total, and during the filtration operation, the backwash of the module with the filtrate was effected for 2 minutes at a frequency of once an hour.

The permeated oil obtained had a wax content of 0.003 wt% according to the GLC analysis. As a result of the cold test, no cloud was observed in the permeated oil. From these results, it is understood that the permeated oil was substantially free of wax.

EXAMPLES 3 TO 5

The porous hollow fiber membrane as prepared in Example 2 was assembled into a module having an effective membrane area of 0.1 m².

Three Sample oils (A, B and C) were prepared by treating a crude sunflower oil of which the properties are shown in Table 1 in the manner as described below.

Sample A:
The crude sunflower oil was cooled to 5° C.

Sample B:
Into the crude sunflower oil, 0.05 wt%, based upon the oil, of phosphoric acid and 2 wt%, based upon the oil, of an aqueous solution of caustic soda of 16° Be (Baumeé degree) were added, followed by stirring. The admixture thus obtained was cooled to 5° C.

Sample C:
The crude sunflower oil was cooled to 5° C., and 0.05 wt%, based upon the oil, of phosphoric acid and 2 wt%, based upon the oil, of an aqueous solution of caustic soda of 16° Be (Baumé degree) were added to the cooled oil, followed by stirring.

Each of these Sample oils was supplied to the above-prepared module, and the filtration was carried out at an oil permeation of about 100%, a filtration temperature of 15° C. and an average filtration pressure of 0.9 kg/cm². The amount of each of the Sample oils supplied to the module during the one hour after the beginning of the filtration was 0.38 liter for Sample A, 0.32 liter for Sample B and 0.31 liter for Sample C.

With respect to each of the permeated oil obtained, the properties were examined, and the results obtained are shown in Table 1.

From the results shown in Table 1, it is understood that each of the peremated oils was substantially free of wax, phospholipid, free fatty acid and water. Moreover, comparison of the results between Sample A and Samples B and C shows that removal of phospholipid and free fatty acid can be increased by addition of an acid and an alkali.

TABLE 1

| | Sample No. | Wax Content | | Phospholipid Content (% by weight) | Free Fatty Acid Content (acid value) | Water Content (% by weight) |
| --- | --- | --- | --- | --- | --- | --- |
| | | GLC analysis (% by weight) | Cold test (clarity) | | | |
| | Crude oil | 0.58 | poor | 0.31 | 2.2 | 2.4 |
| Example 3 | A | 0.008 | excellent | 0.08 | 1.6 | 0.05 |
| Example 4 | B | 0.004 | excellent | 0.01 or less | 0.1 | 0.05 |
| Example 5 | C | 0.006 | excellent | 0.01 or less | 0.5 | 0.05 |

EXAMPLE 6 AND COMPARATIVE EXAMPLE 2

The permeated oil as obtained in Example 3 was decolorized by addition of an activated clay. The decolorized oil was then subjected to steam distillation at 260° C. for 1.5 hours under a pressure of 3 mmHg, thereby to obtain Sample oil P.

On the other hand, the same crude oil as used in Examples 3 to 5 was subjected to degumming (removal of phospholipid) and deacidification (removal of free fatty acid) by a conventional centrifugation method. The thus treated oil was cooled to 5° C. and then subjected to dewaxing by filtration using a filter which had been precoated with perlite. The thus dewaxed oil was dehydrated by vacuum drying, and subjected to decolorization and steam distillation in the same manner as mentioned above, whereby Sample oil p′ was obtained.

The properties of each of Sample oils P and P′ were examined, and the results obtained are shown in Table 2.

From the results shown in Table 2, it is clearly understood that, according to the present invention, in spite of elimination of the preliminary steps of degumming, deacidification and dehydration involved in the conventional process for refining the vegetable oil, it can be obtained a refined oil provided with qualities comparable with those of an oil refined by the conventional complicated process.

The permeated oil was subjected to the cold test. As a result, no cloud was observed in the permeated oil. The result shows that the permeated oil was substantially free of wax.

TABLE 2

| Sample Oil | Wax Content* (% by weight) | Phospholipid Content (% by weight) | Water Content (% by weight) | Color | Acid Value | POV | AOM Stability | Iodine Value | Degradation by Light | | Flavor |
|---|---|---|---|---|---|---|---|---|---|---|---|
| | | | | | | | | | POV | Odor by heating | |
| Example 6 — P | 0.006 | 0.001 or less | 0.05 or less | 3.5 Y/ 0.3R | 0.04 | 0.0 | 19.2 hrs. (POV 11.0) | 137.0 | 1.1 | none | excellent |
| Comparative Example 2 — P' | 0.006 | 0.001 or less | 0.05 or less | 3.1 Y/ 0.3R | 0.04 | 0.0 | 19.2 hrs. (POV 12.0) | 137.0 | 1.0 | none | excellent |

*Wax content was determined by GLC analysis

EXAMPLE 7

A crude sesame oil in which the presence of a wax had been confirmed by the cold test was cooled to 10° C. By using the same module as used in Example 1, the cooled sesame oil was subjected to filtration for 12 hours at an oil permeation of about 100%, a filtration temperature of 20° C. and an average filtration pressure of 2 kg/cm². The backwash of the module with 45° C. nitrogen gas was effected for 2 minutes at a frequency of once an hour. The average oil permeation rate was 175 liter/hr.

The permeated oil was subjected to the cold test. As a result, no cloud was observed in the permeated oil. The result shows that the permeated oil was substantially free of wax.

EXAMPLE 8

A decolorized corn oil in which the presence of a wax had been confirmed by the cold test was cooled to 3° C. By using the same module as used in Example 2, the cooled corn oil was subjected to filtration for 12 hours at an oil permeation of about 100%, a filtration temperature of 5° C. and an average filtration pressure of 2 kg/cm². The backwash of the module with 45° C. nitrogen gas was effected for 2 minutes at a frequency of once an hour. The average oil permeation rate was 24 liter/hr.

The permeated oil was subjected to the cold test. As a result, no cloud was observed in the permeated oil. The result shows that the permeated oil was substantially free of wax.

EXAMPLE 9

A decolorized rape oil in which the presence of a wax had been confirmed by the cold test was cooled to 8° C. By using the same module as used in Example 2, the cooled rape oil was subjected to the filtration for 12 hours at an oil permeation of about 100%, a filtration temperature of 8° C. and an average filtration pressure of 2 kg/cm². The backwash of the module with 45° C. nitrogen gas was effected for 2 minutes at a frequency of once an hour. The average oil permeation rate was 48 liter/hr.

The permeated oil was subjected to the cold test. As a result, no cloud was observed in the permeated oil. The result shows that the permeated oil was substantially free of wax.

What is claimed is:

1. A method of dewaxing a vegetable oil which comprises:
    adjusting the temperature of a vegetable oil containing a wax to a temperature of about −10° C. to about 20° C. to allow the wax to crystallize; and
    subjecting the temperature-adjusted vegetable oil to filtration by means of a porous membrane having pores which form passages running through the membrane from one surface thereof to the other surface thereof,
    said porous membrane having at its surface a critical surface tension ($\gamma c$) of less than 33 dynes/cm and having an average pore diameter of 0.05 to 5 $\mu$m,
    thereby selectively permeating the vegetable oil through the membrane while separating the crystallized wax from the vegetable oil.

2. A method according to claim 1, wherein said porous membrane is a hollow fiber membrane.

3. A method according to claim 1, wherein said porous membrane is a hollow fiber membrane and which further comprises, in the filtration of the temperature-adjusted vegetable oil, intermittently stopping the filtration and subjecting the hollow fiber membrane to backwash treatment and/or flushing treatment by means of a fluid of 30° C. to 100° C., said fluid being a liquid selected from the group consisting of the vegetable oil permeated through the membrane, n-hexane and acetone, or a gas selected from the group consisting of air, nitrogen, oxygen, carbonic acid, argon and helium.

4. A method according to claim 1, wherein said porous membrane has a porosity of 15 to 95%.

5. A method according to claim 2, wherein said hollow fiber membrane has a porosity of 15 to 95%.

6. A method according to claim 3, wherein said hollow fiber membrane has a porosity of 15 to 95%.

7. A method according to claim 1, wherein said porous membrane has a thickness of 0.01 to 4 mm.

8. A method according to claim 2, wherein said hollow fiber membrane has a thickness of 0.01 to 4 mm.

9. A method according to claim 3, wherein said hollow fiber membrane has a thickness of 0.01 to 4 mm.

* * * * *

UNITED STATES PATENT AND TRADEMARK OFFICE
CERTIFICATE OF CORRECTION

PATENT NO. : 4,545,940

DATED : October 8, 1985

INVENTOR(S) : Yoshihiko Mutoh; Kazuo Matsuda; Masashi Ohshima; Hiroo Ohuchi

It is certified that error appears in the above-identified patent and that said Letters Patent is hereby corrected as shown below:

DELETE:

[73] Assignee: Asahi Kasei Kogyo Kabushiki Kaisha, Osaka, Japan

AND REPLACE WITH:

[73] Assignee: Asahi Kasei Kogyo Kabushiki Kaisha, Osaka, Japan
Nisshin Oil Mills, Ltd., Tokyo, Japan Signed and Sealed this Eleventh Day of November, 1986

*Attest:*

DONALD J. QUIGG

*Attesting Officer*  *Commissioner of Patents and Trademarks*